(12) United States Patent
Koike et al.

(10) Patent No.: US 6,937,763 B2
(45) Date of Patent: Aug. 30, 2005

(54) METHOD AND APPARATUS FOR PROCESSING INFORMATION OF AN OBJECT

(75) Inventors: Hiroyuki Koike, Tokyo (JP); Ryo Hirono, Kanagawa (JP); Nobukazu Koyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 642 days.

(21) Appl. No.: 10/037,568

(22) Filed: Nov. 9, 2001

(65) Prior Publication Data

US 2002/0136432 A1 Sep. 26, 2002

(30) Foreign Application Priority Data

Nov. 10, 2000 (JP) .................................... P2000-344500

(51) Int. Cl.$^7$ ............................. G06K 9/46; G06K 9/66
(52) U.S. Cl. .................... 382/190; 345/419; 348/169; 382/154; 382/165; 382/266; 707/3; 707/10; 707/102; 707/104.1; 709/217; 709/229; 715/501.1; 715/513; 715/523
(58) Field of Search ......................... 348/169; 382/165, 382/154, 190, 203; 715/849, 852, 501.1, 513, 526; 345/419; 707/3, 10, 102, 104.1; 709/200, 217, 229

(56) References Cited

U.S. PATENT DOCUMENTS 5,995,649 A * 11/1999 Marugame .................. 382/154
6,272,531 B1 * 8/2001 Shrader ...................... 709/206
6,275,829 B1 * 8/2001 Angiulo et al. .......... 707/104.1
6,751,648 B2 * 6/2004 Kakimoto et al. .......... 709/203
6,757,710 B2 * 6/2004 Reed .......................... 709/203
6,763,496 B1 * 7/2004 Hennings et al. ........ 715/501.1
6,766,350 B1 * 7/2004 Moreau ...................... 709/200

* cited by examiner

*Primary Examiner*—Bhavesh M. Mehta
*Assistant Examiner*—Gregory Desire
(74) *Attorney, Agent, or Firm*—Sonnenschein, Nath & Rosenthal LLP

(57) ABSTRACT

Disclosed are a method and apparatus for automatically embedding information of an object in a video picked up by a camera device. A camera device generates imaging position information relating to an imaging position of the video, and view point information relating to the direction and range of the video taken from the imaging position. An object contained in the video taken by the camera device is searched in an object location managing server, based on object position information relating to the position of the predetermined object, and the imaging position information and the view point information generated by the camera device. The object information of the object hit in the object location managing server is searched in the object information managing server. The display presents an image corresponding to the video picked up by the camera device and an image corresponding to the object information of the object contained in the video.

6 Claims, 6 Drawing Sheets

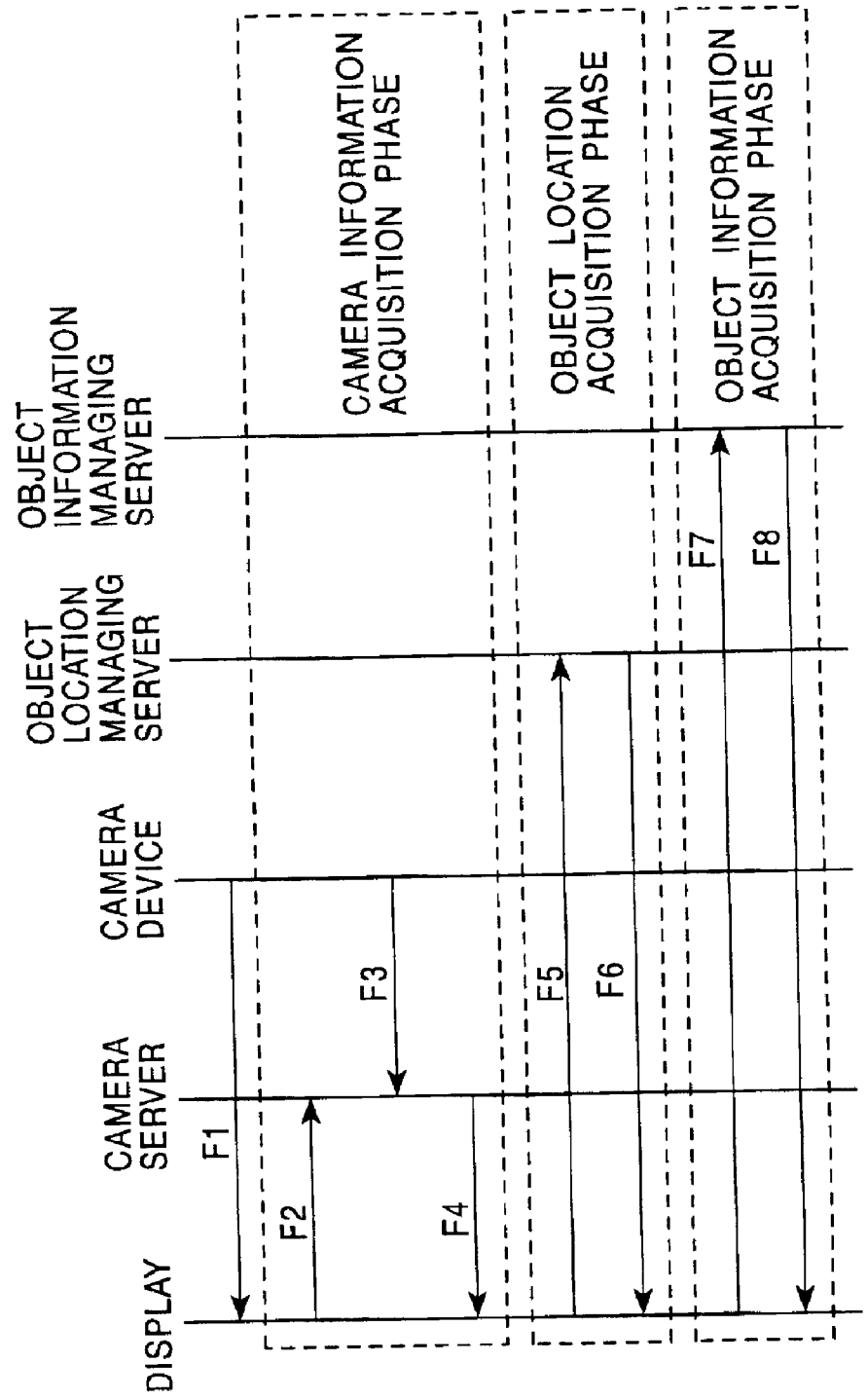

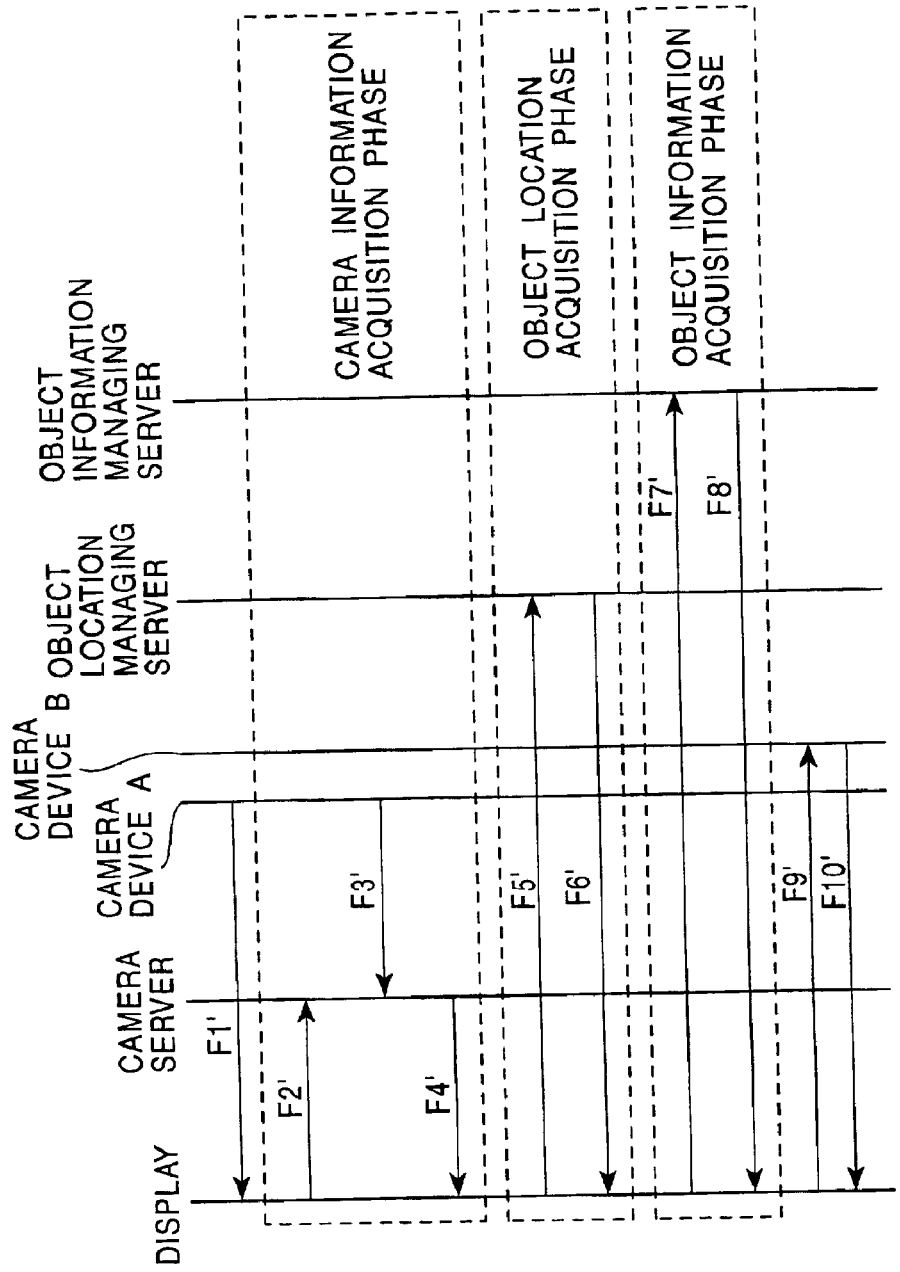

METHOD AND APPARATUS FOR PROCESSING INFORMATION OF AN OBJECT

BACKGROUND OF THE INVENTION

1. Field of the Invention

The present invention relates to a method and apparatus which processes information relating to a predetermined object contained in a captured video and, more particularly, to a method and apparatus which allows a user to select a predetermined object contained in a captured video and displays information relating to the selected object.

2. Description of the Related Art

In a widely used technique, link information, such as a URI (Uniform Resource Identifier) designating a particular resource over the Internet is embedded beforehand in a predetermined object contained in a video captured by a camera device, and a user selects the object having the link information embedded therewithin using a mouse, thereby accessing a resource designated by the URI of the link information.

For example, a URI as link information is embedded beforehand in an actually taken video of a shopping street showing buildings of stores, billboards, etc, to allow users to access Web pages on the Internet that may have been opened by each store owner. The user instantly gets information about each store by simply clicking on a store of interest on the screen of a computer. Using this system, the user may shop in a virtual space using an actual video.

The ease of use of the system is assured because the user operates the system by simply selecting an object in the video on the computer screen. With this technique, information is provided in response to the request of the user on the actual video in an interactive fashion. Reality is much more enhanced in comparison with information provided by a conventional Web page.

Since link information is manually embedded in a video captured by a camera device in a conventional system, workload imposed on an information provider is large. Costs involved in the embedding of the link information are pushed up.

When the position, the direction, and the angle of view of a camera device in use are modified, the location of the link information that is embedded is deviated from the actual object during image pickup. Each time the camera device is moved, the position of the embedded link information needs manually adjusting. Because of this, the view point of the camera device cannot be freely modified. The video, picked up from a stationary position, lacks realistic sensations, and may be monotonous to the users.

SUMMARY OF THE INVENTION

Accordingly, it is an object of the present invention to provide an object information processing method and an object information processing apparatus which automatically extracts information relating to a predetermined object contained in a video by keeping track of a modification in the position, the direction, and the view field of a camera device and presents an image corresponding to the information when the user designates the predetermined object on a screen of the apparatus.

To achiever the above object, the present invention relates to an apparatus for processing information of an object, and includes in an aspect at least one image pickup unit which picks up a video and generates imaging position information relating to a position from which the video is taken, and view point information relating to a direction and a range of the video taken from the position, an object searching unit for searching for a predetermined object contained in the video picked up by the image pickup unit, based on object position information relating to the position of the predetermined object, and the imaging position information and the view point information generated by the image pickup unit, an object information searching unit for searching for object information relating to the predetermined object searched for by the object searching unit, and a display unit for displaying an image corresponding to the video picked up by the image pickup unit and an image corresponding to the object information of the predetermined object.

Preferably, the apparatus further includes a video position information generator unit which generates video position information relating to the position of the predetermined object in the video, based on the object position information of the predetermined object searched for by the object searching unit, and the imaging position information and the view point information generated by the image pickup unit which has taken the video containing the predetermined object, wherein the display unit displays an image corresponding to the object information relating to the predetermined object when a position, in the displayed image, designated in response to a position designating signal being input falls within an area corresponding to the video position information of the predetermined object contained in the video.

When an object designated in response to the position designating signal is the image pickup unit, the display unit preferably displays an image corresponding to the video picked up by the image pickup unit identified by the object information of the object.

In the object information processing apparatus of the present invention, the image pickup unit generates the imaging position relating to the position from which the video is taken, and the view point information relating to the direction and the range of the video taken from the position. The object searching unit searches for the predetermined object contained in the video picked up by the image pickup unit, based on the object position information relating to the position of the predetermined object, and the imaging position information and the view point information generated by the image pickup unit. The object information searching unit searches for the object information relating to the predetermined object searched for by the object searching unit. The display unit displays the image corresponding to the video picked up by the image pickup unit and the image corresponding to the object information of the object.

The video position information generator unit generates the video position information relating to the position of the predetermined object in the video, based on the object position information of the predetermined object searched for by the object searching unit, and the imaging position information and the view point information generated by the image pickup unit which has taken the video containing the predetermined object. The display unit displays the image corresponding to the object information relating to the predetermined object when the position, in the displayed image, designated in response to the position designating signal being input falls within the area corresponding to the video position information of the predetermined object contained in the video.

When the object designated in response to the position designating signal is the image pickup unit, the display unit displays the image corresponding to the video picked up by image pickup unit identified by the object information of the object.

The present invention relates to a method for processing information of an object, and in another aspect includes an image pickup step for picking up a video and generating imaging position information relating to a position from which the video is taken, and view point information relating to a direction and a range of the video taken from the position, an object searching step for searching for a predetermined object contained in the video picked up in the image pickup step, based on object position information relating to the position of the predetermined object, and the imaging position information and the point of view information generated in the image pickup step, an object information searching step for searching for object information relating to the predetermined object searched for in the object searching step, and a display step for displaying an image corresponding to the video picked up in the image pickup step and an image corresponding to the object information of the predetermined object.

Preferably, the method further includes a video position information generating step which generates video position information relating to the position of the predetermined object in the video, based on the object position information of the predetermined object searched for by the object searching step, and the imaging position information and the view point information generated in the image pickup step which has taken the video containing the predetermined object, wherein the display step displays an image corresponding to the object information relating to the predetermined object when a position is designated and when the designated position falls within an area corresponding to the video position information of the predetermined object contained in the video.

When a designated object is image pickup unit, the display step preferably displays an image corresponding to the video picked up by the image pickup unit identified by the object information of the object.

In accordance with the method of the present invention for processing the information of the object, the image pickup step picks up the video and generates the imaging position information relating to the position from which the video is taken, and the view point information relating to the direction and the range of the video taken from the position. The object searching step searches for the predetermined object contained in the video picked up in the image pickup step, based on the object position information relating to the predetermined object, and the imaging position information and the view point information generated in the image pickup step. The object information searching step searches for the object information relating to the predetermined object searched for in the object searching step. The display step displays the image corresponding to the video picked up in the image pickup step and the image corresponding to the object information of the predetermined object.

The video position information generating step generates video position information relating to the position of the predetermined object in the video, based on the object position information of the predetermined object searched for by the object searching step, and the imaging position information and the view point information generated in the image pickup step which has taken the video containing the predetermined object. The display step displays the image corresponding to the object information relating to the predetermined object when the designated position falls within the area corresponding to the video position information of the predetermined object contained in the video.

When the designated object image pickup unit, the display step preferably displays the image corresponding to the video picked up by the image pickup unit identified by the object information of the object.

BRIEF DESCRIPTION OF THE DRAWINGS

FIG. 3 is a data flow diagram of the object information processing apparatus;

FIG. 4 is a data flow diagram of the object information processing apparatus in which a camera device is selected as an object;

DESCRIPTION OF THE PREFERRED EMBODIMENTS

Figure 1:
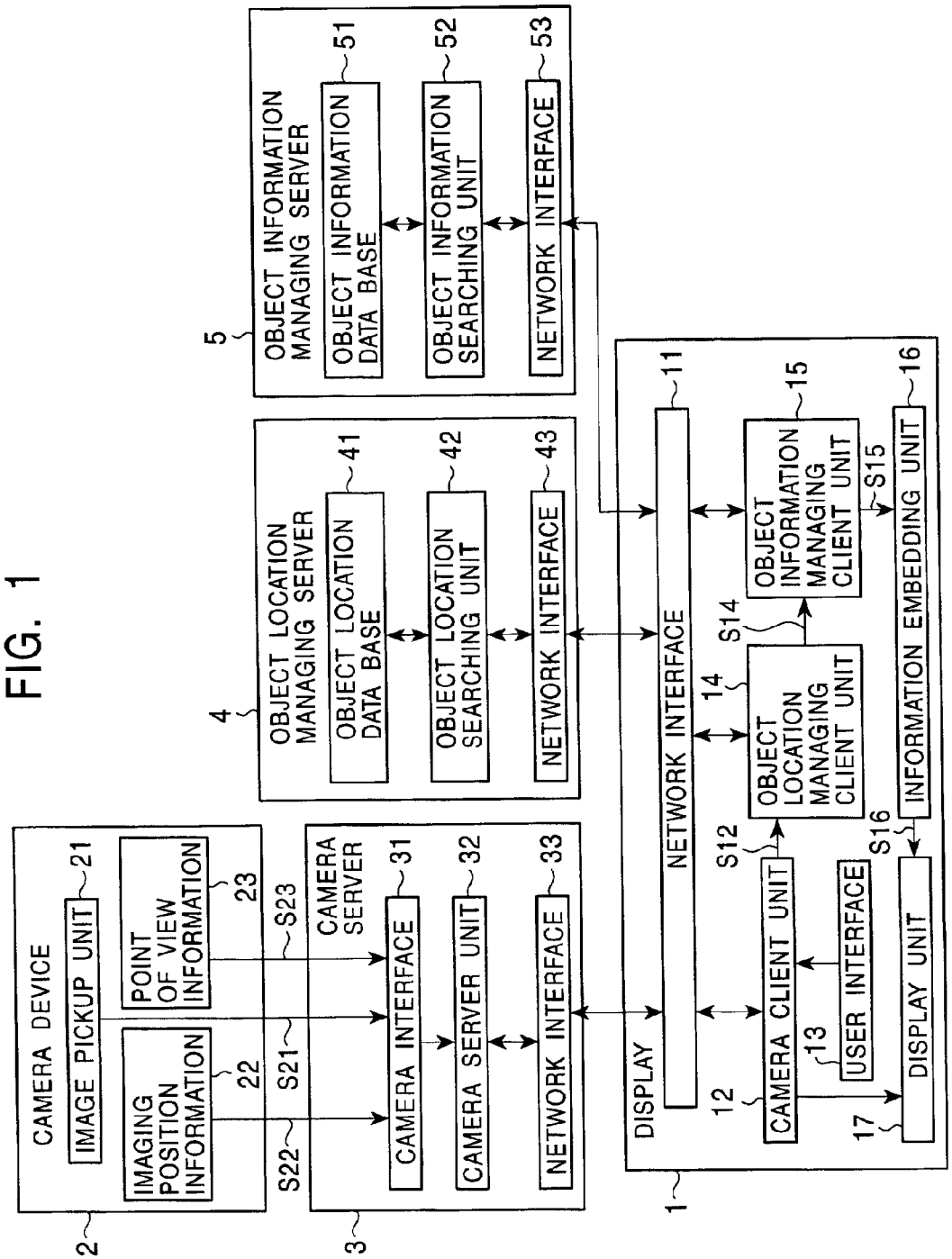
FIG. 1 is a block diagram showing one embodiment of an object information processing apparatus of the present invention.

FIG. 1 diagrammatically shows one embodiment of an object information processing apparatus of the present invention. The object information processing apparatus shown in FIG. 1 includes a display 1, a camera device 2, a camera server 3, an object location managing server 4, and an object information managing server 5.

The camera device 2 and the camera server 3 form one embodiment of an image pickup unit of the present invention.

The object location managing server 4 constitutes one embodiment of an object searching unit of the present invention.

The object information managing server 5 constitutes one embodiment of an object information searching unit of the present invention.

The display 1 is one embodiment of a display unit of the present invention.

The object information processing apparatus shown in FIG. 1 will now be discussed in detail.

Display 1

The display is an information displaying terminal connected to a network such as the Internet. FIG. 1 shows a single display, but a plurality of displays are typically connected to the network.

The display 1 receives video data S21, picked up by the camera device 2, from the camera server 3 via the network, and presents, to the user, an image corresponding to the video data S21. The display 1 communicates with the object location managing server 4 and the object information managing server 5 through the network, and embeds information (i.e., the URI, the type, the color, and the shape of the object), relating to a predetermined object contained in the video received from the camera server 3, into a display screen. When a user designates an object on the display screen using a pointing device such as a mouse or a touchpanel, an image corresponding to the information of the designated object is displayed.

When a URI designates another camera server 3, the display 1 accesses that camera server 3 through the Internet, and receives video data from the camera device 2 connected to the camera server 3. For example, a URI designates a Web page, the display 1 accesses that Web page through the Internet, and displays information described in the HTML on the screen thereof.

A network interface 11 performs a process for communicating with another server or a terminal through the network, and inputs and outputs data in accordance with a predetermined protocol compatible with the network.

A camera client unit 12 requests the camera server 3 connected to the camera device 2 to send the video data of a video picked up by the camera device 2, and displays the video data received in response to the request on a display unit 17.

When a user interface 13 selects another camera device 2, the user interface 13 inputs link information of the camera device 2, and the display 1 accesses the camera server 3 designated in the link information. The display 1 requests (camera) information, such as imaging position information and view point information, relating to the camera device 2, to the camera server 3. The display 1 outputs, to an object location managing client unit 14, the camera information received from the camera server 3 in response to the request.

The user interface 13 performs a process for receiving a request from the user. The user designates any position on the display screen using the pointing device such as a mouse or a touchpanel. When object information (such as a URI, the type, the color, and the shape of the object) is embedded in the position designated by the user, the object information is output to a processing block of the object information. A variety of processes is thus performed in accordance with the object information.

For example, when a camera device 2, different from the camera device 2 now receiving the video, is selected from among objects displayed on the display unit 17, the link information of the selected camera device 2 is output to the camera client unit 12 to notify the camera client unit 12 that the user selects another camera device 2. In this way, the camera client unit 12 executes a process for receiving the video from the selected camera device 2.

When the information relating to the selected object is the URI of the Web page, the URI is output to an unshown processing block that performs a process for displaying the Web page on the display unit 17.

When the information relating to the selected object is a telephone number, the telephone number is output to an unshown processing block that performs a process for calling the selected telephone to perform an automatic call.

The object location managing client unit 14 receives the information relating to the camera device 2 receiving the video (the imaging position information and the view point information) from the camera client unit 12, and sends the information to the object location managing server 4, thereby requesting the object location managing server 4 to search for a predetermined object contained in the video picked up by the camera device 2. The object location managing client unit 14 receives the ID number and the object position information of the object searched for in response to the request, from the object location managing server 4, and outputs these pieces of information to a object information managing client unit 15.

The object information managing client unit 15 sends the ID number of the object, received from the object location managing client unit 14, to the object information managing server 5, requesting the object information managing server 5 to search for the object information relating to the object. The object information managing client unit 15 receives, from the object information managing server 5, the object information searched for in response to the request. The object information managing client unit 15 outputs, to an information embedding unit 16, the received object information and the objection position information, and the information relating to the camera device 2 (the imaging position information and the view point information).

The information embedding unit 16 performs a process for embedding the object information on the display screen, based on the object information and the object position information received from the object information managing client unit 15, and the information relating to the camera device 2 (the imaging position information and the view point information). Specifically, the information embedding unit 16 calculates the location of the object on the display screen from the object position information, the imaging position information, and the view point information, and associates the object information with the any position with respect to the calculated position. For example, when the user interface 13 designates a position close to the position at which the object information is embedded, the object information associated with the designated position is output to a block such as the camera client unit 12, and a process in accordance with the object information is performed there.

The video data for displaying a predetermined image corresponding to the object information at the position at which the object information is embedded may be output to the display unit 17. For example, when the type of the object is a camera device, video data for displaying an icon representing a camera at the embedding position is output from the information embedding unit 16 to the display unit 17.

The information embedding unit 16 is one embodiment of the video position information generator unit of the present invention. Referring to FIG. 1, the information embedding unit 16 is contained in the display 1. The present invention is not limited to this arrangement. Alternatively, the function of this block may be performed in another server.

The display unit 17 synthesizes and displays the video data of the camera device 2 output from the camera client unit 12 and the video data from the information embedding unit 16. Furthermore, the display unit 17 receives a variety of video data generated in response to the object information of the object designated by the user interface 13, and displays the video data on the screen thereof.

Camera Device 2

The camera device 2 includes an image pickup device such as a CCD (Charged-Coupled Device), and outputs a signal S21 of the captured video to a camera server unit 32. The camera device 2 also includes a block such as a GPS (Global Positioning System) receiver for generating information relating to a geographic position thereof. The camera device 2 outputs, to the camera server 3, the generated information as information relating to the imaging position of the camera device 2 (the imaging position information). The camera device 2 further generates information relating to the direction at which the camera device 2 looks, and information relating to the range of the camera device 2 including the magnification and the angle of view, and outputs, to the camera server 3, these pieces of information as the information relating to the view point of the camera device 2 (the view point information).

An image pickup unit 21 is an image pickup device such as a CCD, and outputs the signal S21 of the captured video to the camera server 3.

An imaging position information generator 22 is a block for generating the imaging position information relating to the position at which the camera device 2 captures the video. The imaging position information generator 22 outputs the generated imaging position information to the camera server 3. A device such as a GPS receiver for generating the information of the geographic position thereof is used for the imaging position information generator 22.

A view point information generator 23 generates the view point information of the image pickup unit 21, such as the information relating to the imaging direction, and the information relating to the imaging range such as the magnification and the angle of view. The view point information generator 23 outputs the generated information to the camera server 3. The information of the imaging direction is generated with respect to a reference direction that is obtained using a gyroscope.

Camera Server 3

The camera server 3 sends, to the display 1, information including the video data generated by the camera device 2, the imaging position information, the view point information, etc. in response to a request from the display 1. Referring to FIG. 1, a single camera device 2 is connected to the camera server 3. Alternatively, a plurality of camera devices 2 may be connected to the camera server 3.

A camera interface 31 inputs the video signal S21 picked up by the camera device 2, the imaging position information S22, the view point information S23, etc., to the camera server unit 32.

In response to a request from the camera client unit 12 in the display 1, the camera server unit 32 sends the imaging position information and the view point information of the camera device 2 to the requesting display 1.

A network interface 33 is a block used to communicate with another server or a terminal via the network, and inputs and outputs data in accordance with a predetermined protocol compatible with the network.

Object Location Managing Server 4

The object location managing server 4 searches for an object contained in a video picked up by the camera device 2, from among predetermined objects registered in the position information is registered, based on the imaging position information and the view point information of the camera device 2 received together with an object position acquisition request from the display 1. The object location managing server 4 then sends the ID number unique to the searched object and the position information of the object to the requesting display 1.

An object location data base 41 stores an ID number uniquely identifying the object, and the position information of the object (the object position information), with both being associated with each other.

An object location searching unit 42 calculates the range of the video now taken by the camera device 2, based on the imaging position information and the view point information of the camera device 2, received together with the object position information request from the display 1. The object location searching unit 42 then searches for an object having the object position information contained in the calculated range of the video, in the object location data base 41. When a matching object has been hit, the ID number and the object position information thereof are send to the requesting display 1.

Figure 2:
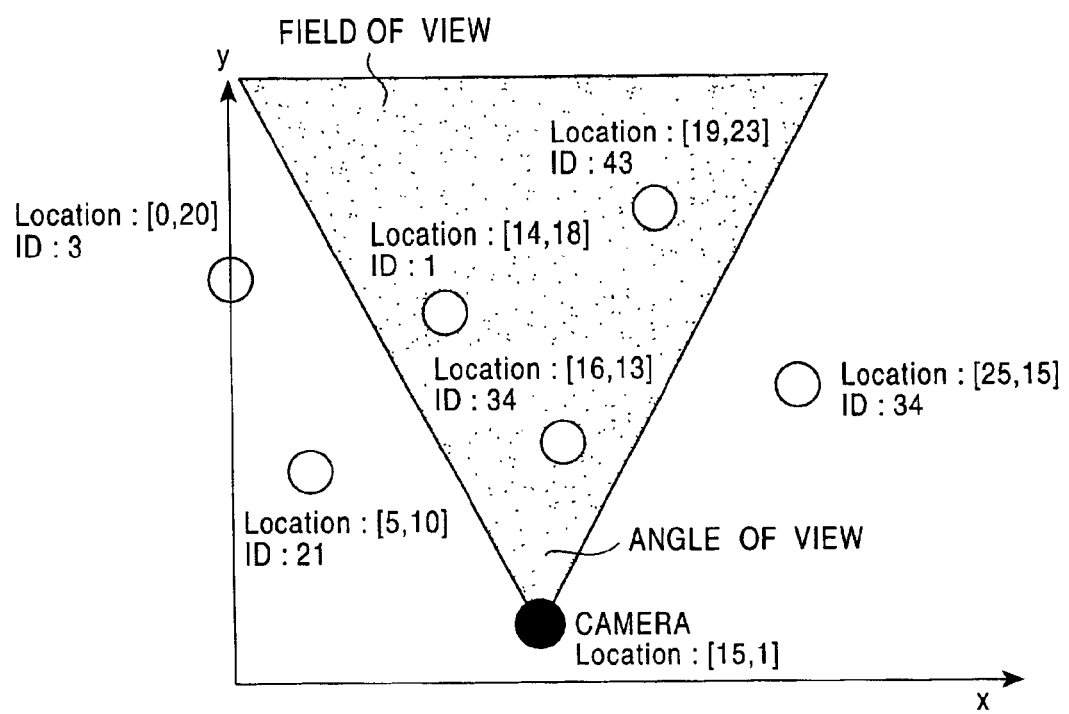
FIG. 2 is a diagram explaining a searching operation for searching an object contained in a video captured in a camera device.

FIG. 2 illustrates the searching operation of an object contained in the video captured by the camera device 2. As shown, the x axis and the y axis are imaginary coordinate axes used to designate the position of each object. Hollow circles shown in FIG. 2 represent the positions of the objects, and a solid circle represents the position of the camera device. The word "Location" next to each object represented by a hollow circle indicates the object position information, while the "ID" indicates an ID number.

Referring to FIG. 2, the objects are located in a two-dimensional plane. Typically, however, the position of each object is designated as a three dimensional position.

Objects respectively having an ID number 1, an ID number 34, and an ID number 43 contained within an "angle of view" in FIG. 2 are the objects contained in a video picked up by the camera device 2, and the remaining objects are not contained in the video. By designating the imaging position information and the view point information of the camera device 2, the range of the video picked up by the camera device 2 is determined in three-dimensional space. The objects having position information falling within this range are thus searched for in the object location data base 41.

The network interface 43 is a block for communicating with another server or a terminal over the network, and inputs and outputs data in accordance with a protocol compatible with the network.

Object Information Managing Server 5

The object information managing server 5 receives the ID number of the object together with the object information acquisition request from the display 1, and searches for the object information of the object corresponding to the received ID number, from among the object information registered with the ID numbers of the objects associated therewith. The object information managing server 5 sends the searched object information to the requesting display 1.

An object information data base 51 stores the ID number unique to each object, and the information (object information) of the object such as the URI, the type, the color and the shape thereof, with the ID number associated with the object information.

An object information searching unit 52 receives, from the display 1, the ID number of the object together with the object information acquisition request, searches for the object information of the object corresponding to the received ID number, from among the objects registered in the object information data base 51, and sends the matching object information to the requesting display 1.

A network interface 53 is a block for communicating with another server or a terminal over the network, and inputs and outputs data in accordance with a predetermined protocol compatible with the network.

The operation of the object information processing apparatus thus constructed will now be discussed. FIG. 3 is a data flow diagram of the object information processing apparatus. The operation of the data flow is carried out when the camera device receiving the video is switched, or when the imaging position information or the view point information of the camera device 2 is modified during the reception of the video.

In the discussion that follows, the operation of the object information processing apparatus is divided into four phases: a camera information acquisition phase, an object location acquisition phase, an object information acquisition phase, and an information embedding phase. Since the information embedding phase is the process to be carried out in the display 1, the data flow shown in FIG. 3 does not include this process.

Data Flow F1

The video data picked up by the image pickup unit 21 in the camera device 2 is sent to the display 1 from the camera device 2 via the camera server 3.

<Camera Information Acquisition Phase>

In the camera information acquisition phase (corresponding to data flows F2 through F4), the camera server 3 sends camera information to a requesting display 1 in response to an acquisition request of the camera information (the imaging position information and the view point information) issued by the display 1.

Data Flow F2

The display 1, which has received the video information, sends a query about the imaging position information and the view point information of the camera device 2 to the camera server 3 which is the sender of the video data.

Data Flow F3

The camera device 2 outputs the imaging position information and the view point information to the camera server 3. The timing of the data flow F3 is not necessarily subsequent to the timing of the data flow F2. The data flow F3 may be carried out before the data flow F2.

The following table 1 lists an example of the imaging position information and the view point information output from the camera device 2 to the camera server 3.

TABLE 1

| Location | 15, 1, 4 |
|---|---|
| Field angle | 45° |
| View angle | n-15.7° |

As listed, the "location" is the imaging position information, representing a three-dimensional position having coordinates (15, 1, 4). The "field angle" and the "view angle" are the view point information, indicating that the field angle is 45° and that the imaging direction is 15.7° clockwise from the north.

Data Flow F4

In response to the request from the display 1, the camera server 3 sends the above-listed imaging position information and view point information of the camera device 2 to the display 1.

<Object Position Acquisition Phase>

In the object position acquisition phase (corresponding to data flows F5 and F6), the object location managing server 4 searches for a predetermined object contained in the video picked up by the camera device 2, based on the imaging position information and the view point information acquired in the camera information acquisition phase. The display 1 acquires the ID number and the object position information of the searched object.

Data Flow F5

The imaging position information and the view point information received by the camera client unit 12 in the display 1 in the data flow 4 are sent to the object location managing server 4 from the object location managing client unit 14. The display 1 thus requests the object location managing server 4 to search for the object contained in the captured video of the camera device 2.

Data Flow F6

The object location managing server 4 searches for an object having the position information falling within the imaging range determined by the imaging position information and the view point information on which a search request has been made, from among the objects registered in the object location data base 41. The ID number and the object position information of the matching object are then sent to the requesting display 1.

Table 2 lists an example of the ID number and the object position information of the object sent from the object location managing server 4 to the display 1.

TABLE 2

| ID | 34 |
|---|---|
| Location | 16, 13, 2 |

In the above example, the "ID" is an ID number of the object, being 34. The "location" is the object position information, thereby representing that the imaging position is a three-dimensional position having coordinates (16, 13, 2). When a plurality of objects is contained in the video, data of ID numbers and object position information, like the ones shown above, are sent for each object.

<Object Information Acquisition Phase>

In the object information acquisition phase (corresponding to data flows F7 and F8), the object location managing server 4 searches for the object information of the object contained in the video in accordance with the ID number of the object searched for in the object position acquisition phase, and the display 1 then acquires the searched object information.

Data Flow F7

In the data flow F7, the ID number of the object received by the object location managing client unit 14 in the display 1 is sent to the object information managing server 5 through the object information managing client unit 15. The display 1 thus requests the object information managing server 5 to search for the object information of the object having that ID number.

Data Flow F8

The object information corresponding to the ID number about which a search request has been made is searched among the object information registered in the object information data base 51. The searched object information is then sent to the requesting display 1.

Table 3 lists the object information sent from the object information managing server 5 to the display 1.

TABLE 3

| URI | http://www.sony.co.jp |
|---|---|
| TEL | 123-456-7890 |
| Attribute | office |
| Color | white |
| Size | 45 m (W) × 10 m (H) × 20 m (D) |

In the above object information, the "URI" is that of the object, the "TEL" is a telephone number of the object, the "attribute" is the attribute of the object, the "color" is the color of the object, and the "size" is the size of the object.

<Information Embedding Phase>

The information embedding unit 16 in the display 1 embeds the object information in the display screen, based on the imaging position information, the view point information, and the object position information acquired in each of the above phases. The location of the object in the display screen is calculated based on the object position information, the imaging position information, and the view point information. The object information is thus associated with any position corresponding to the calculated position.

For example, when the user interface 13 designates a position in the vicinity of the embedding position of the object information, the object information associated with the designated position is output to a processing block such as the camera client unit 12, and the process corresponding to the object information is performed there.

The operation of the information processing apparatus when the camera device 2 is selected as an object will be now discussed.

FIG. 4 is a data flow diagram in which the camera device 2 is selected as an object.

Data Flow F1'

Video data picked up by a camera device A is sent to the display 1 from the camera device A via the camera server 3.

<Camera Information Acquisition Phase>

Data Flow F2'

The display 1, which has received the video data, sends an query about the imaging position information and the view point information of the camera device A to the camera server 3, which is the sender of the video data.

Data Flow F3'

The camera device A outputs the imaging position information and the view point information to the camera server 3. The timing of the data flow F3' is not a necessarily subsequent to the timing of the data flow F2'. The data flow F3' may be carried prior to the data flow F2'.

Data Flow F4'

In response to a request from the display 1, the camera server 3 sends the imaging position information and the view point information of the camera device A to the display 1.

<Object Position Acquisition Phase>

Data Flow F5'

In the data flow F4', the imaging position information and the view point information received by the camera client unit 12 in the display 1 are sent to the object location managing server 4 from the object location managing client unit 14. An object, having these pieces of information, contained in the video captured by the camera device A is searched for.

Data Flow F6'

The object, having the position information contained in the imaging range determined by the imaging position information and the view point information on which a search request has been made, is searched for from among the objects registered in the object location data base 41. The ID number and the object position information of the matching object are sent to the requesting display 1.

<Object Information Acquisition Phase>

Data Flow F7'

The ID number of the object, received by the object location managing client unit 14 in the display 1 in the data flow F6', is sent from the object information managing client unit 15 to the object information managing server 5. The object information of the object having the ID number is then searched.

Data Flow F8'

The object information, corresponding to the ID number with which a search request has been made, is searched in the object information data base 51. The hit object information is then sent to the display 1.

Table 4 lists the object information sent from the object information managing server 5 to the display 1.

TABLE 4

| URI | http://www.sony.co.jp |
|---|---|
| TEL | 123-456-7890 |
| Attribute | Camera |
| Color | Black |
| Size | 0.2 m (W) × 0.2 m (H) × 0.2 m (D) |

In the above example of the object information, the "URI" is that of the object, the "TEL" is the telephone number of the object, the "attribute" is the attribute of the object, the "color" is the color of the object, and the "size" is the size of the object.

<Information Embedding Phase>

The information embedding unit 16 embeds the object information in the display screen, based on the imaging position information, the view point information, and the object position information acquired in respective phases. Specifically, the location of the object on the display screen is calculated based on the object position information, the imaging position information, and the view point information. The object information is thus associated with any position corresponding to the calculation position.

Data Flow F9'

The user interface 13 in the display 1 selects another camera device B, different from the selected camera device A, from among the objects displayed on the display unit 17. The link information of the selected camera device 2 (the URI, for example) is output to the camera client unit 12 from the user interface 13. The camera client unit 12 sends a request to send video to the camera device B via the camera server 3 designated by the link information. Referring to FIG. 4, both the camera device A and the camera device B are connected to the camera server 3.

Data Flow F10'

In response to the request from the display 1, the video data of the camera device B is sent to the requesting display 1 via the camera server 3. In response to the video data from the camera device B, the display unit 17 in the display 1 switches from the video of the camera device A to the video of the camera device B.

The camera information acquisition phase, the object position acquisition phase, the object information acquisition phase, and the information embedding phase are thus repeated, and the object information is embedded in the display screen of the captured video of the camera device B.

Figure 5A:
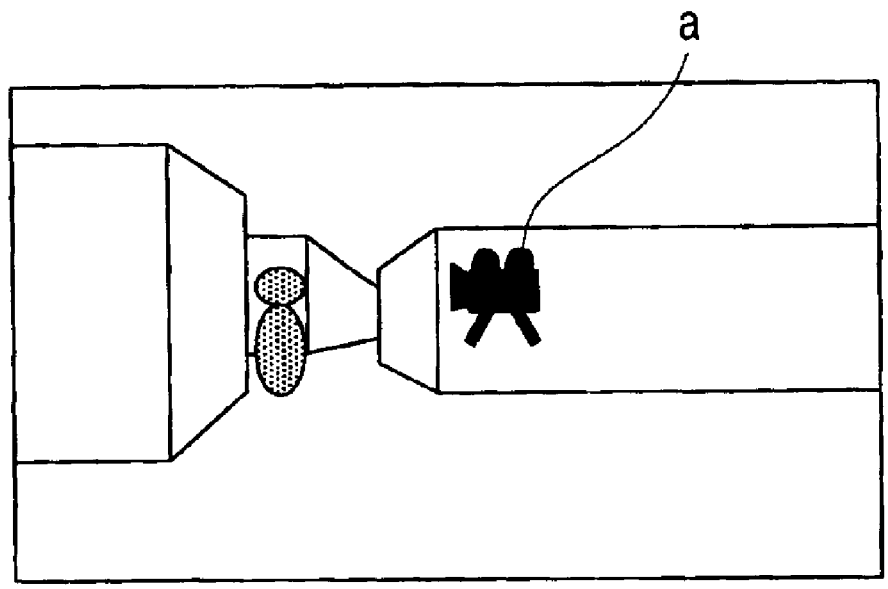
FIGS. 5A and 5B show display screen examples in which the video of the camera device is switched with the camera device selected as an object.
Figure 5B:
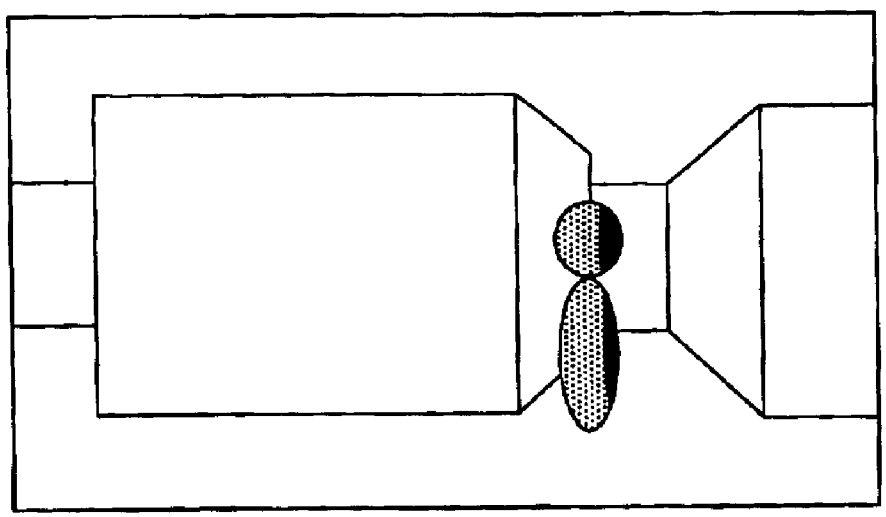

FIGS. 5A and 5B show display examples, in which the displayed video of the camera device is switched by selecting the camera device as an object.

FIG. 5A shows the display screen, presented on the display unit 17 in the display 1, prior to the switching of the video of the camera device. The video from the camera device A is presented. An icon a indicates an embedding position where the object information of the camera device B is embedded, and is generated by the information embedding unit 16 in the display 1.

When the user designates the icon a having a camera-like shape using the user interface 13 (for example, clicking on a mouse), the displayed video is switched from that of the camera device A to that of the camera device B (see FIG. 5B).

By switching the camera device receiving the video in a simple operation, the user sees a single object from a various angles, or enjoys the video from the camera device with the feeling as if the user really walks around in a street.

Figure 6:
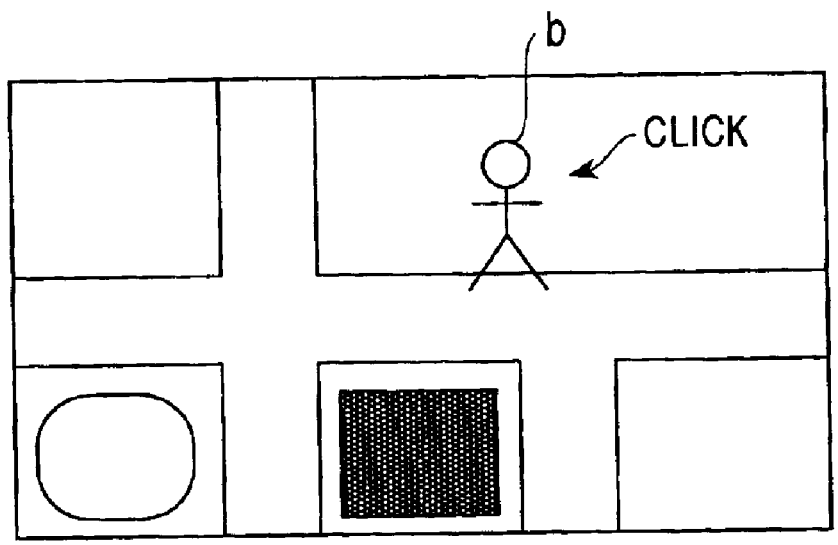
FIG. 6 shows a display screen example in which communication is performed with a person on the screen selected.

The present invention is not limited to the above embodiment, and is applicable to a wide variety of applications. Referring to FIG. 6, communications with a person b may be established by selecting the person b displayed on the screen of the display 1. In this case, the person b is registered as an object in the object location data base 41, and address information for establishing communications is registered in the object information data base 51.

For example, the person b carries a terminal provided with a device generating position information, such as a GPS receiver, and linked to a network. As the person b moves around, the object position information generated by the GPS receiver is registered in the object location managing server 4. Communications are possible by selecting the person b, the icon of which moves on the screen of the display 1 on a real time basis.

The display 1, the camera device 2, and the camera server 3 are integrated into a mobile terminal so that the object information is embedded in the video picked up by the camera device 2 on a real time basis. When the user carrying the mobile terminal with him walks around in an unfamiliar street, the user can easily collect information about the street by simply causing the display 1 to display the video picked up by the camera device 2 of the mobile terminal.

The object information processing apparatus shown in FIG. 1 generates, in the camera device 2, the imaging position information relating to the position at which the camera device takes the video, and the view point information relating to the direction and range of the video taken from the position. The object contained in the video picked up by the camera device 2 is searched in the object location managing server 4, based on the object position information relating to the position of the predetermined object and the imaging position information and the view point information generated in the camera device 2. Next, the object information of the object, hit in the object location managing server 4, is then searched in the object information managing server 5. The display 1 displays an image corresponding to the video picked up by the camera device 2 and an image corresponding to the object information of the object contained in the video. In this arrangement, a predetermined object contained in the video picked up by the camera device 2 is automatically extracted, and the conventional process manually performed is thus skipped. Even when the imaging position information and the view point information are modified, an object contained in the video is automatically extracted. This arrangement permits the view point of the camera device to be freely modified.

The information embedding unit 16 calculates the embedding position of the object information during video taking, based on the object position information of the object hit in the object location managing server 4, and the imaging position information and the view point information generated in the camera device 2 which picks up the video containing the hit object. When the location on the display screen designated by the user interface 13 is the embedding position calculated by the information embedding unit 16, the display 1 displays an image corresponding to the object information of the object. The object information is automatically embedded in the predetermined object contained in the video taken by the camera device 2. This conventional, otherwise manually performed process is skipped. Costs involved in the conventional process are thus eliminated. Even when the imaging position information and the view point information of the camera are modified, the object information is automatically embedded into the object contained in the video. The camera device is free in the view point setting thereof, thereby increasing realistic sensations or reality of the display video.

When the object selected by the user interface 13 is another camera device 2, the display 1 displays an image corresponding to the video picked up by the camera device 2 identified by the object information of the object. The video from the camera device is thus freely switched and displayed by selecting the camera device displayed on the screen or the icon representing the camera device in a simple manner. Realistic sensations or reality of the video is thus increased.

In accordance with the object information of the object selected by the display 1, the display 1 can communicate with a communication device identified by the object information through the Internet or the like. In addition to the function of providing the user with information, the display 1 allows the user to communicate with an unspecified entity displayed on the screen of the display 1.

The present invention is not limited to the above-referenced embodiment. For example, each server shown in FIG. 5 may be formed of a single computer, or a plurality of computers among which a process is distributed. When these apparatuses are formed of a plurality of computers, communications between the computers may be performed over any of a variety of networks, including the Internet.

The object information processing apparatus automatically extracts the information relating to the predetermined object contained in the video, thereby keeping track of a modification in the imaging direction and the imaging range of the camera device. The user views the image corresponding to the information by designating the predetermined object on the screen of the apparatus. When the object is the camera device, the apparatus easily switches to the video picked up by the camera device by designating the camera device in a simple operation.

What is claimed is:

1. An apparatus for processing information of an object, comprising:
    at least one image pickup means which picks up a video and generates imaging position information relating to a position from which the video is taken, and view point information relating to a direction and a range of the video taken from the position,
    object searching means for searching for a predetermined object contained in the video picked up by the image pickup means, based on object position information relating to the position of the predetermined object, and the imaging position information and the view point information generated by the image pickup means,
    object information searching means for searching for object information relating to the predetermined object searched for by the object searching means,
    display means for displaying an image corresponding to the video picked up by the image pickup means and an image corresponding to the object information of the predetermined object; and
    video position information generator means which generates video position information relating to the position of the predetermined object in the video, based on the object position information of the predetermined object searched for by the object searching means, and the imaging position information and the view point information generated by the image pickup means which has taken the video containing the predetermined object,
    wherein the display means displays an image corresponding to the object information relating to the predetermined object when a position, in the displayed image, designated in response to a position designating signal being input falls within an area corresponding to the video position information of the predetermined object contained in the video.

2. An apparatus according to 1, wherein when an object designated in response to the position designating signal is the image pickup means, the display means displays an image corresponding to the video picked up by the image pickup means identified by the object information of the object.

3. An apparatus according to claim 2, wherein the display means comprises communication means which communicates with a communication device, identified by the object information, in accordance with the object information of the predetermined object.

4. A method for processing information of an object, comprising:

an image pickup step for picking up a video and generating imaging position information relating to a position from which the video is taken and view point information relating to a direction and a range of the video taken from the position, an object searching step for searching for a predetermined object contained in the video picked up in the image pickup step, based on object position information relating to the position of the predetermined object, and the imaging position information and the view point information generated in the image pickup step, an object information searching step for searching for object information relating to the predetermined object searched for in the object searching step, a display step for displaying an image corresponding to the video picked up in the image pickup step and an image corresponding to the object information of the predetermined object; and a video position information generating step which generates video position information relating to the position of the predetermined object in the video, based on the object position information of the predetermined object searched for by the object searching step, and the imaging position information and the view point information generated in the image pickup step which has taken the video containing the predetermined object, wherein the display step displays an image corresponding to the object information relating to the predetermined object when a position is designated in the displayed image and when the designated position falls within an area corresponding to the video position information of the predetermined object contained in the video.

5. A method according to claim 4, wherein when a designated object is image pickup means, the display step displays an image corresponding to the video picked up by the image pickup means identified by the object information of the object.

6. A method according to claim 4, wherein the display step comprises a communication substep for communicating with a communication device, identified by the object information, in accordance with the object information of the predetermined object.

* * * * *